(12) United States Patent
Östlund et al.

(10) Patent No.: US 11,508,180 B2
(45) Date of Patent: Nov. 22, 2022

(54) ADAPTIVE READOUT FROM A GLOBAL SHUTTER OPTICAL BIOMETRIC SENSOR

(71) Applicant: Fingerprint Cards Anacatum IP AB, Gothenburg (SE)

(72) Inventors: Petter Östlund, Lund (SE); Hans Thörnblom, Hålta (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 17/760,874

(22) PCT Filed: Jul. 8, 2021

(86) PCT No.: PCT/SE2021/050696
§ 371 (c)(1),
(2) Date: Mar. 16, 2022

(87) PCT Pub. No.: WO2022/025810
PCT Pub. Date: Feb. 3, 2022

(65) Prior Publication Data
US 2022/0342842 A1  Oct. 27, 2022

(30) Foreign Application Priority Data

Jul. 29, 2020 (SE) ...................................... 050929-5

(51) Int. Cl.
*G06V 40/13* (2022.01)
*H04N 5/378* (2011.01)
*G06F 13/42* (2006.01)
(52) U.S. Cl.
CPC ......... *G06V 40/1318* (2022.01); *H04N 5/378* (2013.01); *G06F 13/4282* (2013.01); *G06F 2213/0002* (2013.01)

(58) Field of Classification Search
CPC ............ G06V 40/1318; G06F 13/4282; G06F 2213/0002; H04N 5/378; H04N 5/37455;
(Continued)

(56) References Cited

U.S. PATENT DOCUMENTS 6,728,366 B1   4/2004  Barkarö et al.
8,675,107 B2 *  3/2014  Yamashita ........... H04N 5/3598
                                                    250/214 R
(Continued)

FOREIGN PATENT DOCUMENTS

JP   S62115518 A    5/1987
JP   H04291822 A   10/1992
JP   H08335878 A   12/1996

OTHER PUBLICATIONS

International Search Report and Written Opinion for Application No. PCT/SE2021/050699 dated Sep. 9, 2021 (8 pages).
(Continued)

*Primary Examiner* — Michael S Osinski
(74) *Attorney, Agent, or Firm* — RMCK Law Group, PLC (57) ABSTRACT

The present invention relates to an optical biometric sensor comprising: a read-out circuitry controllable for converting analog sensing signals to digital signals, the analog sensing signals being indicative of an image acquired by an image sensor comprising an array of photodetectors; and a timing circuitry configured to control the read-out circuitry to provide digital signals based on a present data transfer capacity on a data transfer bus configured to transfer data indicative of the digital signals from the optical biometric sensor to a host device.

14 Claims, 6 Drawing Sheets

(58) Field of Classification Search
CPC .... H04N 5/374; H04N 5/3698; H04N 5/3745; H04N 5/37452; H04N 5/357; H04N 5/369; H04N 5/379; H04N 5/3575; H04N 5/3765; H04N 5/3454; H04N 5/3559; H03M 1/56; H03M 1/123; H03M 1/12

See application file for complete search history.

(56) References Cited

U.S. PATENT DOCUMENTS

| Patent/Publication No. | | Date | Name | Classification |
|---|---|---|---|---|
| 10,798,329 | B2* | 10/2020 | Kobayashi | H04N 5/37455 |
| 11,227,135 | B2* | 1/2022 | Hung | G06V 40/1306 |
| 11,270,615 | B2* | 3/2022 | Choi | G09G 3/20 |
| 11,315,492 | B2* | 4/2022 | Choi | G09G 3/3233 |
| 2003/0016297 | A1 | 1/2003 | Shigeta | |
| 2010/0026844 | A1 | 2/2010 | Hopkins | |
| 2013/0016798 | A1* | 1/2013 | Velazquez | H04L 25/14 341/155 |
| 2013/0214127 | A1* | 8/2013 | Ohya | H04N 5/37455 250/208.1 |
| 2014/0036120 | A1* | 2/2014 | Hagihara | H04N 5/374 348/300 |
| 2014/0204427 | A1* | 7/2014 | Nakazawa | H04N 5/3692 250/214 DC |
| 2014/0367550 | A1* | 12/2014 | Aisu | H01L 27/144 250/206 |
| 2014/0368713 | A1* | 12/2014 | Matsuda | H04N 5/359 348/308 |
| 2015/0138411 | A1* | 5/2015 | Nakamura | H04N 5/3745 327/54 |
| 2015/0163436 | A1* | 6/2015 | Hijikata | H04N 5/3745 250/208.1 |
| 2015/0281539 | A1* | 10/2015 | Ueki | H04N 19/86 348/298 |
| 2015/0281616 | A1* | 10/2015 | Muto | H04N 5/3765 348/322 |
| 2015/0323382 | A1* | 11/2015 | Valer'Evich | G01J 1/44 341/137 |
| 2016/0182845 | A1* | 6/2016 | Hagihara | H04N 5/378 348/301 |
| 2016/0211299 | A1* | 7/2016 | Arita | H01L 27/14636 |
| 2017/0237914 | A1* | 8/2017 | Cho | H04N 5/3698 348/241 |
| 2017/0308152 | A1* | 10/2017 | Trichy | G06F 1/3234 |
| 2018/0027174 | A1 | 1/2018 | Sengoku | |
| 2018/0270438 | A1* | 9/2018 | Niwa | H04N 5/37457 |
| 2019/0006412 | A1* | 1/2019 | Ando | H01L 27/14643 |
| 2019/0147213 | A1 | 5/2019 | Yazdandoost et al. | |
| 2019/0222786 | A1* | 7/2019 | Kobayashi | H04N 5/3745 |
| 2019/0312079 | A1* | 10/2019 | Odahara | H01L 27/14812 |
| 2020/0084412 | A1 | 3/2020 | Matsuno | |
| 2020/0186734 | A1* | 6/2020 | Nagawa | H04N 5/379 |
| 2020/0195870 | A1* | 6/2020 | Shim | H04N 5/3559 |
| 2020/0366863 | A1* | 11/2020 | Etou | H04N 5/37455 |
| 2021/0021773 | A1* | 1/2021 | Lee | H04N 5/378 |
| 2021/0087614 | A1* | 3/2021 | Hall | G01N 27/028 |
| 2021/0099657 | A1* | 4/2021 | Kuroda | H04N 5/3454 |
| 2021/0144330 | A1* | 5/2021 | Otaka | H04N 5/3698 |
| 2021/0176418 | A1* | 6/2021 | Yin | H04N 5/37455 |
| 2021/0185250 | A1* | 6/2021 | Moue | H04N 5/357 |
| 2021/0326623 | A1* | 10/2021 | Kato | H01L 27/14621 |
| 2021/0377470 | A1* | 12/2021 | Malone | H04N 5/37452 |
| 2021/0385345 | A1* | 12/2021 | Takahashi | H04N 1/1065 |
| 2021/0399726 | A1* | 12/2021 | Yamazaki | H02J 50/20 |
| 2021/0409623 | A1* | 12/2021 | Jang | H04N 5/378 |
| 2022/0036818 | A1* | 2/2022 | Yin | G09G 3/3233 |
| 2022/0046197 | A1* | 2/2022 | Moue | H01L 31/10 |
| 2022/0166949 | A1* | 5/2022 | Moue | H04N 5/355 |

OTHER PUBLICATIONS

International Search Report and Written Opinion for International Application No. PCT/SE2021/050696 dated Sep. 2, 2021 (9 pages).

Yin et al. "Optical Under-Display Fingerprint Sensor With Global shutter and High-Dynamic-Range Operation" In 2020 IEEE Custom Integrated Circuits Conference (CICC), pp. 1-4, Mar. 2020 (4 pages).

* cited by examiner

ADAPTIVE READOUT FROM A GLOBAL SHUTTER OPTICAL BIOMETRIC SENSOR

CROSS-REFERENCE TO RELATED APPLICATIONS

This application is a 371 U.S. National Stage of International Application No. PCT/SE2021/050696, filed Jul. 8, 2021, which claims priority to Swedish Patent Application No. 2050929-5, filed Jul. 29, 2020. The disclosures of each of the above applications are incorporated herein by reference in their entirety.

FIELD OF THE INVENTION

The present invention generally relates to an optical biometric sensor and to a timing circuitry arrangeable in an optical biometric sensor.

BACKGROUND

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor or be of camera type optical sensor.

When the optical sensor is included in a host device, data must be transferred from the optical sensor to the host device over a data bus such as a serial peripheral interface. Such a data bus has a limited data transfer capability and is often controlled by the host device whereas the optical sensor controls the data readout from its pixel matrix. This may lead to conflicts between the amount of data produced by the optical sensor and the capability of the data bus to handle the transfer of data to the host, and thereby to sub-optimal utilization of the data transfer capability on the bus, or to the need for costly buffer solutions.

In other words, there is room for improvements with regards to better utilize the data transfer capability on the bus between the sensor and a host device.

SUMMARY

In view of above-mentioned and other drawbacks of the prior art, it is an object of the present invention to provide an optical biometric sensor having a timing circuitry to alleviate at least some of the drawbacks of prior art.

According to a first aspect of the invention, there is provided an optical biometric sensor comprising: a read-out circuitry controllable for converting analog sensing signals to digital signals, the analog sensing signals being indicative of an image acquired by an image sensor comprising an array of photodetectors; and a timing circuitry configured to control the read-out circuitry to provide digital signals based on a present data transfer capacity on a data transfer bus configured to transfer data indicative of the digital signals from the optical biometric sensor to a host device.

The present invention is based on the realization that the conversion rate of the analog sensing signals to digital signals is closely related to the rate of the data to be transferred on the data transfer bus. Therefore, if the read-out circuitry can be controlled according to the present data transfer capacity, it can be ensured that the amount of produced data can be transferred on the bus without unnecessary delay. In other words, the data transfer bus can handle the data as it is produced.

For example, the timing circuitry may be configured to control the operation of the read-out circuitry such that a data production rate resulting from the converted analog sensing signals is below or equal to the present data transfer capacity on the data transfer bus. In other words, the data production rate of the data to be provided to the data transfer bus may be controlled by the timing circuitry such that the data production rate is low enough for the data transfer bus to transfer the data without or at least with reduced need for intermediate storage.

Accordingly, the inventors realized that by controlling the operation of the read-out circuitry, the rate of the produced data to be transferred on the data transfer bus, can be adjusted to a level that the data transfer bus capacity can handle.

Embodiments of the present disclosure allows for optimizing the data transfer between the optical biometric sensor and a host device even if they run on different clocks which inevitably leads to asynchronous clocks at different speeds and consequently to, as is the case in prior art, non-optimized use of the communication interface.

The image sensor may be any suitable type of image sensor, such as a CMOS or CCD sensor connected to associated control circuitry. In one possible implementation the image sensor is a thin-film transistor (TFT) based image sensor which provides a cost-efficient solution for under display fingerprint imaging sensors. The operation and control of such image sensors can be assumed to be known and will not be discussed herein. The TFT image sensor may be a back illuminated TFT image sensor or a front illuminated TFT image sensor. The TFT image sensor may be arranged as a Hot-zone, Large Area or Full display solution.

A photodetector is generally a pixel of the image sensor.

For image acquisition, the photodetectors are exposed for a predetermined time, as is known to the skilled person, and relates to that the photodetector is active to collect light.

The optical biometric sensor may comprise an analog to digital conversion circuitry for converting analog sensing signals acquired by the image sensor to digital sensing signals that are transferrable data on the data transfer bus. In other words, the analog to digital conversion circuitry is arranged to receive, at an input port, analog sensing signals from the array of photodetectors, and to convert the analog signals to digital signals, whereby the digital signals are provided, at an output port, to the data transfer bus. It is the digital sensing signals that are transferred on the data transfer bus to the host device.

In embodiments, the timing circuitry may be configured to control the operation interval durations of the read-out circuitry such that a data production rate resulting from the converted analog sensing signals is below or equal to the present data transfer capacity on the data transfer bus. For this, the timing circuitry is configured to control the start of operation and the stop of operation of the analog to digital conversion performed by the read-out circuitry to in this way control the data production rate. Thus, the operation may be that during a first time interval, the read-out circuitry operates in a first mode at an conversion rate for converting analog sensing signals to digital signals, and during a second time interval the read-out circuitry is in a second mode where it has paused its operation so that analog sensing signals are not presently being converted to digital signals. In the second mode, the data transfer bus may not receive new data from the read-out circuitry.

In embodiments, the optical biometric sensor may be configured to perform data processing to adjust a data production rate resulting from the acquired sensing signals to thereby adjust an amount of data to transfer on the data transfer bus. In this way may the data production rate from the image sensor be adjusted so that the produced data do not exceed the present data transfer capacity of the data transfer bus, or so that more useful data can be transferred, thereby improving the utilization of the data transfer bus to transfer relevant data. Thus, the data processing changes the data rate or the amount of data to be transfer to the host device. The data processing may be digital data processing.

In embodiments, the data processing may be local post-processing settings of the image sensor adapted to cause a reduction in data production rate. Such local post-processing settings may be masking, binning and/or skipping, whereby the data production rate can be adjusted.

According to some embodiments, the optical biometric sensor may comprise a memory storage configured to store data indicative of the acquired sensing signals for a time duration such that a data transfer rate to the data transfer bus is below or equal to the present data transfer capacity on the data transfer bus. Thus, in some alternative embodiments is a memory storage, e.g. a buffer, used for storing, for a time duration, the acquired sensing signals such that the data production rate can be adapted to the present data transfer capacity on the data transfer bus.

The memory storage may be configured to store digital data converted by the read-out circuitry, and to store the converted digital data, and wherein the analog to digital conversion rate is adapted exceed the data transfer date of the data transfer bus.

Preferably, the host device is a master and the optical biometric sensor is a slave for the communication interface including the data transfer bus. The timing circuitry may comprise a receiving port configured to receive a signal from the host controller on a communication bus for initiating image acquisition. For example, optical biometric sensor may be an SPI (Serial Peripheral Interface) slave comprising a sensor communication interface having an SPI port comprising a serial clock input (SCLK), a master output slave input (MOSI), a master input slave output (M ISO, and a slave select input (CS).

The image sensor may be a global shutter image sensor. For a global shutter sensor, the photodetectors are exposed simultaneously and with equal exposure time durations.

According to a second aspect of the invention, there is provided a timing circuitry arrangeable in an optical biometric sensor having an image sensor comprising an array of photodetectors for acquiring analog sensing signals, and a read-out circuitry controllable for converting the analog sensing signals to digital signals, the timing circuitry being configured to control the read-out circuitry to provide digital signals based on a present data transfer capacity on a data transfer bus configured to transfer data indicative of the digital signals from the optical biometric sensor to a host device.

The timing circuitry may be configured to control the operation of the read-out circuitry such that a data production rate resulting from the converted analog sensing signals is below or equal to the present data transfer capacity on the data transfer bus.

The timing circuitry may be configured to control the operation interval durations of the read-out circuitry such that a data production rate resulting from the converted analog sensing signals is below or equal to the present data transfer capacity on the data transfer bus.

Further effects and features of the second aspect of the invention are largely analogous to those described above in connection with the first aspect of the invention.

According to a third aspect of the invention, there is provided a method for controlling an optical biometric sensor having an image sensor comprising an array of photodetectors for acquiring analog sensing signals, and a read-out circuitry controllable for converting the analog sensing signals to digital signals, the method comprising: obtaining an indication of a present data transfer capacity on a data transfer bus configured to transfer data indicative of the digital signals from the optical biometric sensor to a host device; and controlling the read-out circuitry to provide digital signals based on the present data transfer capacity.

The read-out circuitry may be controlled to provide digital signals at a rate based on the present data transfer capacity.

In embodiments, the method may comprise controlling the operation of the read-out circuitry such that a data production rate resulting from the converted analog sensing signals is below or equal to the present data transfer capacity on the data transfer bus.

In embodiments, the method may comprise controlling the operation interval durations of the read-out circuitry such that a data production rate resulting from the converted analog sensing signals is below or equal to the present data transfer capacity on the data transfer bus.

Further effects and features of the third aspect of the invention are largely analogous to those described above in connection with the first aspect and the second aspect of the invention.

There is further provided an electronic device comprising: the optical biometric sensor according to embodiments of the present disclosure, and processing circuitry configured to: receive a signal from the optical biometric sensor indicative of a biometric feature, and perform a biometric authentication procedure based on the biometric feature.

The electronic device may be a mobile device. A mobile device may be a mobile phone, a tablet, a laptop computer, a smartwatch, etc.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the optical biometric imaging arrangement according to the present invention are mainly described with reference to an optical biometric imaging arrangement arranged under a display panel. However, it should be noted that the described imaging device also may be used in other optical biometric imaging applications such as in an optical fingerprint sensor located under a cover glass or the like, or under a cover on the back side of a mobile device.

Figure 1:
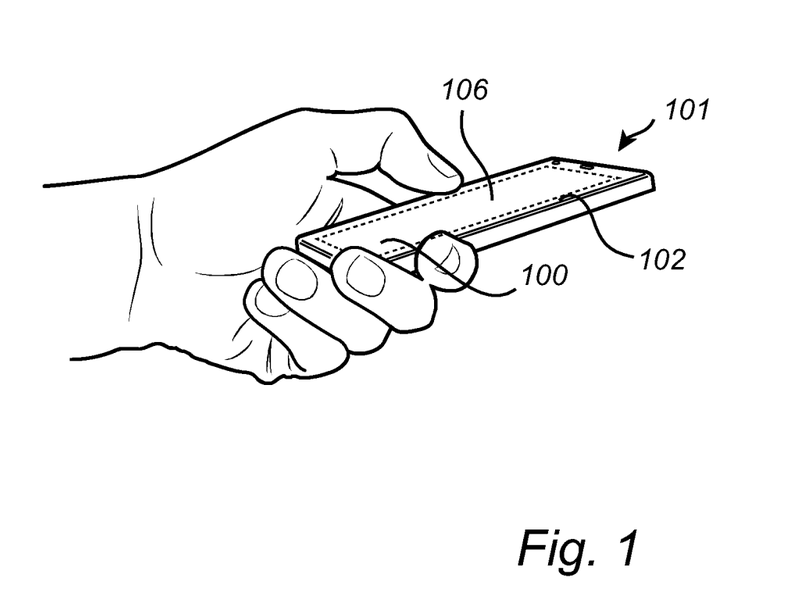
FIG. 1 schematically illustrates an example of an electronic device according to embodiments of the invention.

Turning now to the drawings and in particular to FIG. 1, there is schematically illustrated an example of an electronic device configured to apply the concept according to the present disclosure, in the form of a mobile device 101 with an integrated in-display optical biometric sensor 100 and a display panel 102 with a touch screen interface 106. The optical biometric sensor 100 may, for example, be used for unlocking the mobile device 101 and/or for authorizing transactions carried out using the mobile device 101, etc.

The optical biometric sensor 100 is here shown to be smaller than the display panel 102, but still relatively large, e.g. a large area implementation. In another advantageous implementation the optical biometric sensor 100 may be the same size as the display panel 102, i.e. a full display solution. Thus, in such case the user may place his/her finger anywhere on the display panel for biometric authentication. The optical biometric sensor 100 may in other possible implementations be smaller than the depicted optical biometric sensor, such as providing a hot-zone implementation.

Preferably and as is apparent for the skilled person, the mobile device 101 shown in FIG. 1 may further comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Figure 2:
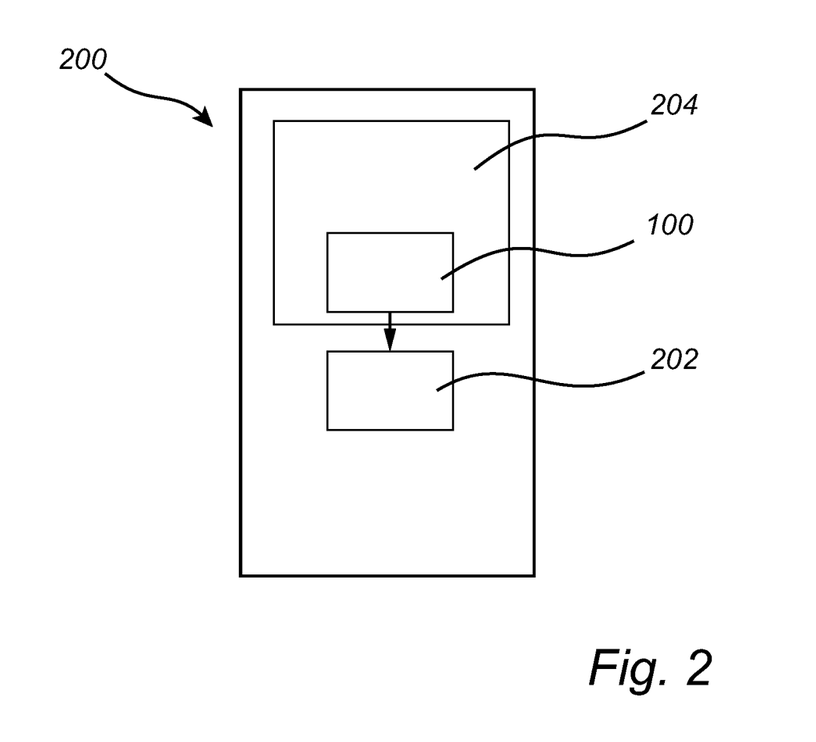
FIG. 2 is a schematic box diagram of an electronic device according to embodiments of the invention.

FIG. 2 is a schematic box diagram of an electronic device according to embodiments of the invention. The electronic device 200 comprises a transparent display panel 204 and an optical biometric sensor 100 conceptually illustrated to be arranged under the transparent display panel 204 according to embodiments of the invention. Furthermore, the electronic device 200 comprises processing circuitry such as control unit 202. The control unit 202 may be stand-alone control unit of the electronic device 202, e.g. a device controller. Alternatively, the control unit 202 may be comprised in the optical biometric sensor 100.

The control unit 202 is configured to receive a signal indicative of a detected object from the optical biometric sensor 100. The received signal may comprise image data.

Based on the received signal the control unit 202 is arranged to detect e.g. a fingerprint. Based on the detected fingerprint the control unit 202 is configured to perform a fingerprint authentication procedure. Such fingerprint authentication procedures are considered per se known to the skilled person and will not be described further herein.

Figure 3:
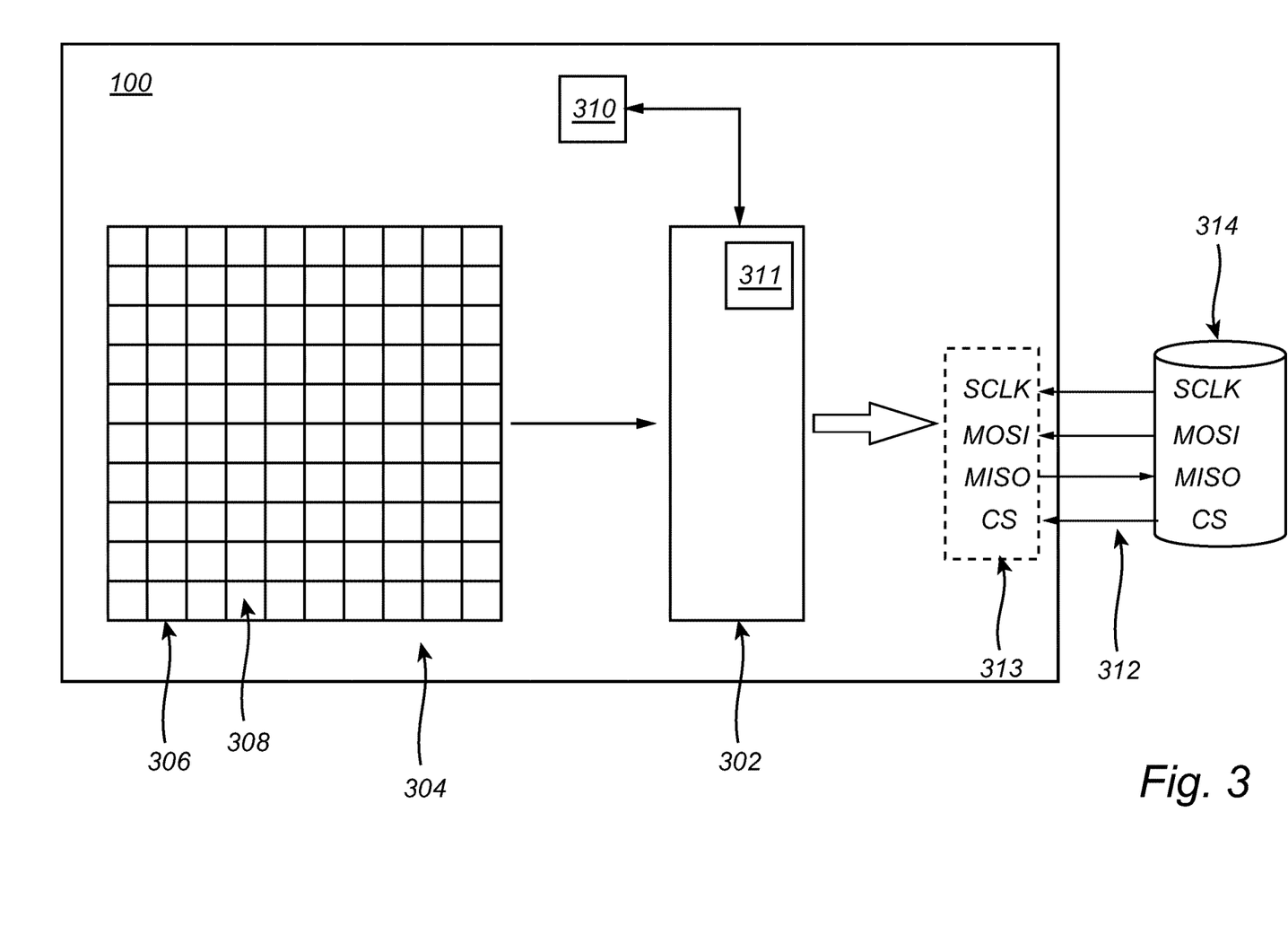
FIG. 3 schematically illustrates an optical biometric sensor and a host device according to embodiments of the invention.

FIG. 3 is a block diagram for schematically describing an optical biometric sensor according to embodiments of the invention.

The optical biometric sensor 100 comprises a read-out circuitry 302 controllable for converting analog sensing signals to digital signals. The analog sensing signals being indicative of an image acquired by an image sensor 304 comprising an array 306 of photodetectors 308 of which not all are numbered.

Further, a timing circuitry 310 is configured to control the read-out circuitry to provide digital signals based on a present data transfer capacity on a data transfer bus 312 configured to transfer data indicative of the digital signals from the optical biometric sensor to a host device 314.

The optical biometric sensor may be included in the host device 314 which may be e.g. the electronic device 200 or the mobile device 100.

The image sensor 304 may be a global shutter image sensor.

Preferably, the timing circuitry 310 is configured to control the operation of the read-out circuitry 302 such that a data production rate resulting from the converted analog sensing signals is below or equal to the present data transfer capacity on the data transfer bus 312.

The data transfer bus 312 may be a serial peripheral interface (SPI) or an I3C interface although other types of data transfer busses configured to transfer data are conceivable. The timing circuitry 310 thus has knowledge either directly or indirectly of the present data transfer capacity on the data transfer bus. For example, the timing circuitry 310 may receive information of the present data transfer capacity from the host device 314, or the present data transfer capacity may be a fixed capacity given by the configuration of the data bus itself, and in such cases may information of the data bus capacity be stored or accessible by the timing circuitry 310.

During image acquisition, the photodetectors are simultaneously exposed as is the case for a global shutter image sensor. Once exposure is finalized, the sensing signal are read-out and digitalized by the read-out circuitry and subsequently they are transferred, in digital form, to the host device 314 on the data transfer bus 312. However, if the rate of produced digital data is larger than the data transfer capability on the bus, all the data must be stored before it can be transferred. Embodiments of the present disclosure aims to resolve this prior art problem. Accordingly, if the data production rate can be adapted so that the data transfer bus 312 can handle the produced data, there is no or reduced need for intermediate storage of data. For achieving this, the read-out circuitry is appropriately controlled. This allows for producing data at a rate that the data transfer bus 312 can immediately transfer to the host device 314.

The read-out block includes electrical components known per se, for transferring charges from the photodiodes of the image sensor pixel matrix to a voltage, e.g. an analog sensing signal, and for converting the analog signals to a digital signal, i.e. analog to digital converters.

The communication interface is exemplified as an SPI-interface 312. For this, the optical biometric sensor 100 may include a sensor communication interface 313 having an SPI port comprising a serial clock input (SCLK); a master output slave input (MOSI), a master input slave output (MISO), and a slave select input (CS).

The timing circuitry may in a conceptual manner realized by a counter which starts counting, when exposure of the photodetectors is initiated by the host device 314, to a given threshold value depending on the data transfer rate of the communication interface 312, e.g. an SPI interface and the read-out time duration. Once the threshold value is reached read-out of a new subset of pixels is started. The skilled person knows various possible ways of enabling such a counter, such as using a processor or any other suitable electrical component or circuitry.

Figure 4:
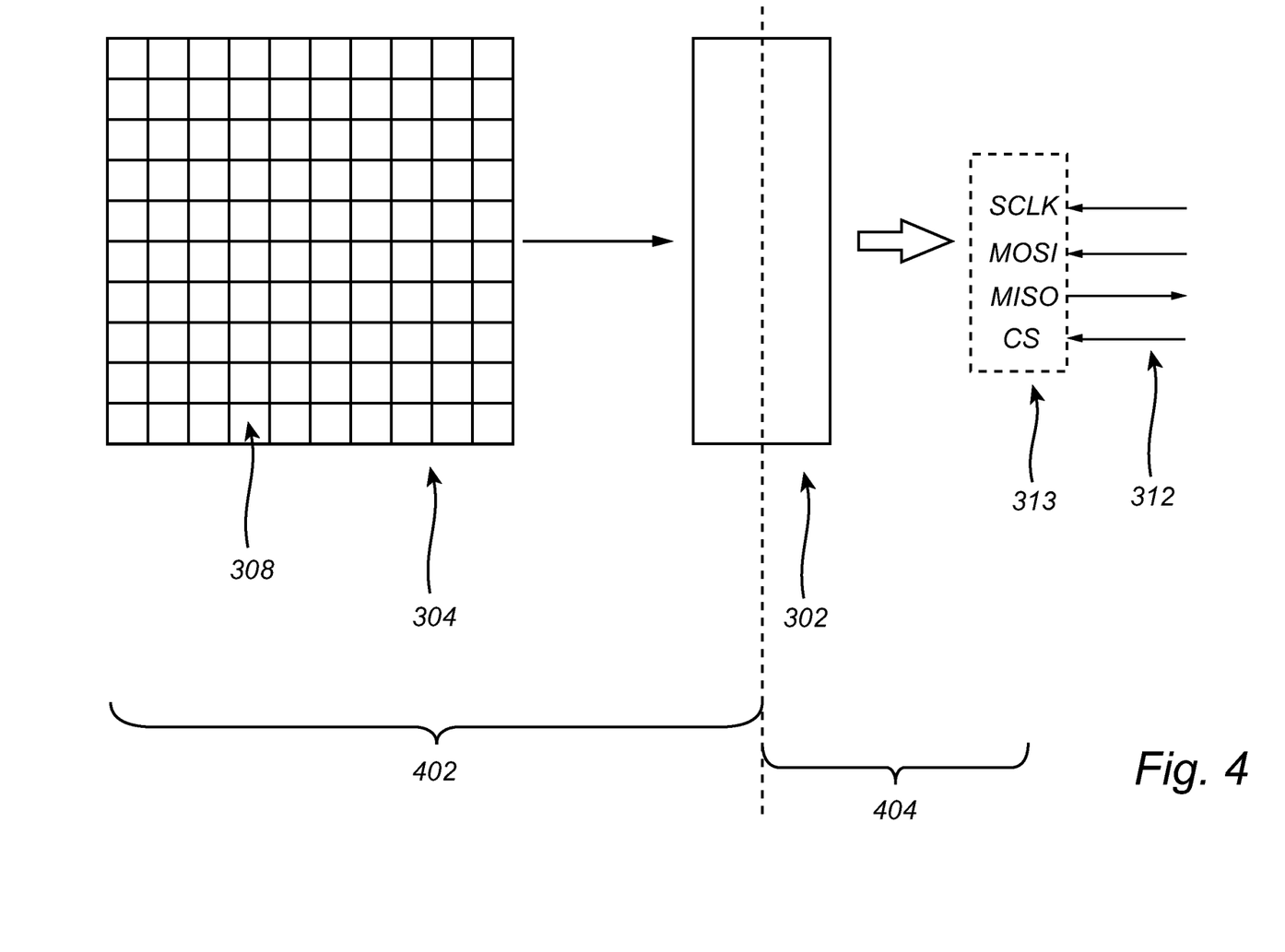
FIG. 4 conceptually illustrates analog and digital domains of the optical biometric sensor.

Preferably, the timing circuitry 310 is configured to control the operation interval durations of the read-out circuitry 302 such that a data production rate resulting from the converted analog sensing signals is below or equal to the present data transfer capacity on the data transfer bus. Thus, as conceptually illustrated in FIG. 4, when the photodetectors 308 have been exposed, the analog signals resulting therefrom is maintained in the analog domain 402 until they are read-out. The analog to digital conversion circuitry of the read-out circuitry 302 is often operated at a fixed conversion rate. By starting and stopping the conversion, the amount of data and thus also the rate of data provided to the data transfer bus 312 can be controlled to be at level below or equal to the capacity of the bus 312. In other words, it is possible to "fill" the digital domain 404 at a rate below the capacity of the data transfer bus 312.

A memory storage 311 such as a buffer or a first-in-first-out (FIFO) type memory may be included in the optical biometric sensor and be configured to store data indicative of the acquired sensing signals for a time duration such that a data transfer rate to the data transfer bus 312 is below or equal to the present data transfer capacity on the data transfer bus. Here, the read-out circuitry 302 may comprise the buffer, e.g. a digital memory 311 such as a FIFO type memory, as conceptually illustrated in FIG. 3. This buffer/FIFO 311 is configured to store digital data originating from a subset of photodetectors 308. As soon as data has been converted and stored in digital form on the buffer or FIFO 311, the analog to digital conversion of analog signals from a next subset of photodetectors is initiated. The conversion of data is ensured to be faster than the transfer rate of the SPI-bus 312 such that the conversion of data of a next subset is completed before all digital data has been read from the buffer/FIFO 311 by the SPI interface. As soon as the buffer/FIFO 311 is empty, new data is added/written to the buffer/FIFO 311. Using the buffer/FIFO 311 advantageously allows for controlling the data production rate resulting from the converted analog sensing signals.

Figure 5A:
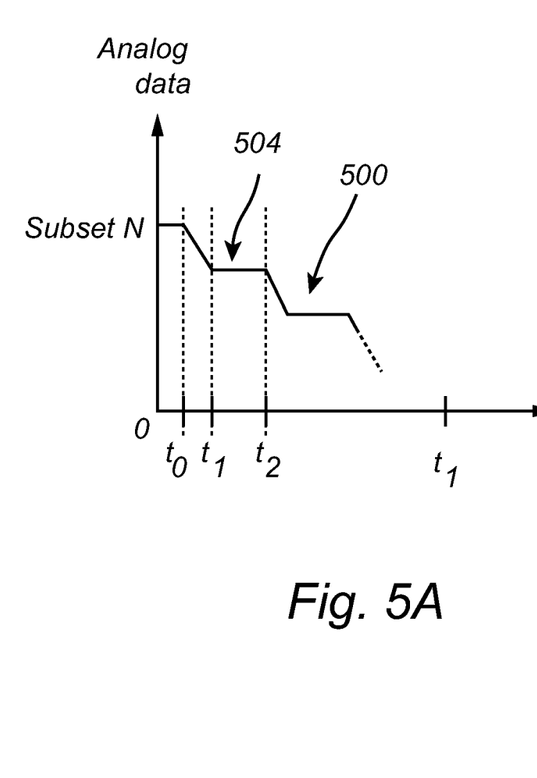
FIG. 5A is a graph conceptually illustrating the amount of analog data that is read-out from the analog domain as a function of time.

FIG. 5A is a graph conceptually illustrating the amount of analog data that present in the analog domain 402 as a function of time after an exposure of the photodetectors. At time 0, analog data from all the photodetectors resulting from a simultaneous exposure of all the photodetectors 308, as is commonly the case for a global shutter image sensor, is in the analog domain 402, e.g. stored in a memory storage device. As illustrated in FIG. 5A, the read-out circuitry 302 is controlled by the timing circuitry to start reading out data at time t0 and read out data at a constant rate until time t1 when the conversion to digital data by the read-out circuitry 302 is on hold thereby forming the plateau 504. The read-out circuitry 302 is controlled to pause such that the overall production rate of digital data does not exceed the transfer capacity of the data transfer bus. Thus, there is no or at least reduced need to store the digital data before it is transferred on the bus 312. Subsequently, at time t2 when the data transfer bus again has capacity, the read-out circuitry 302 is again controlled to resume read-out of analog data. This procedure is repeated until all the analog data has been read-out and transferred as digital data to the host device over the bus 312.

Figure 5B:
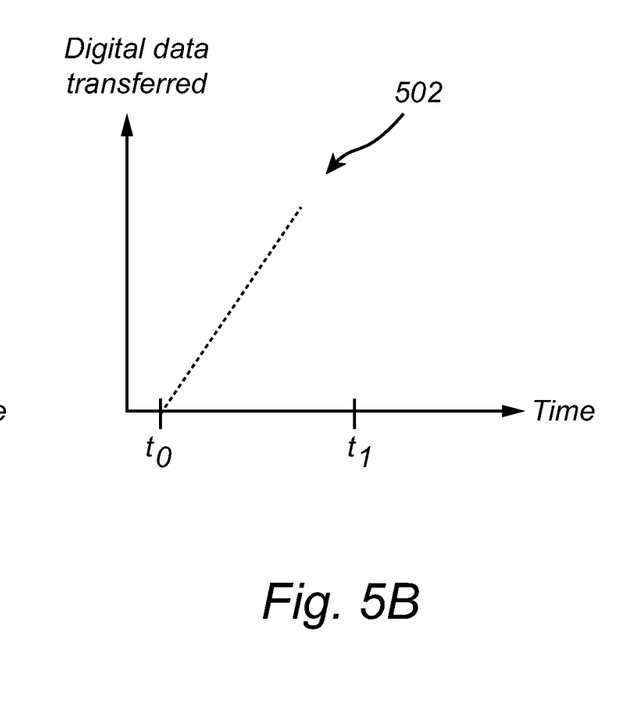
FIG. 5B conceptually illustrates the amount of digital data transferred to the host device over the bus after an exposure of the entire array of photodetectors.

Preferably, the read-out of data is performed such that a continuous data transfer is performed to the host device. Thus, as shown in FIG. 5B, illustrating the amount of digital data transferred to the host device over the bus 312 after an exposure of the entire array of photodetectors. The gradient of the line 502 represents the rate of transfer over the bus 312 and is equal to the data bus capacity. That the curve is a straight line indicates that there is no delay, i.e. the bus can continuously transfer data that it is being fed from the analog domain. The digital data is transferred at the same rate as it is produced.

The optical biometric sensor 100 may be configured to perform data processing to adjust a data production rate resulting from the acquired sensing signals to thereby adjust an amount of data to transfer on the data transfer bus. For example, data processing may be performed in order to reduce the amount of data to transfer over the bus, which enables for reducing the total time for data transfer to the host. The data processing may be local post-processing settings of the image sensor 304 adapted to cause a reduction in data production rate. Example data processing is local post-processing settings of the image sensor adapted to cause a reduction in data production rate. For example, such local post-processing setting may be e.g. binning of the sensing signals, or generally pixel values, to thereby reduce the amount of produced data. Binning generally refer to combining a group of pixel values into a single value. Another example local post-processing setting is skipping of photodetectors, e.g. not start exposure or not reading out the data from the photodetectors. A further example is masking of photodetectors in the array, i.e. so-called image masking where some pixel values are set to zero.

Figure 6:
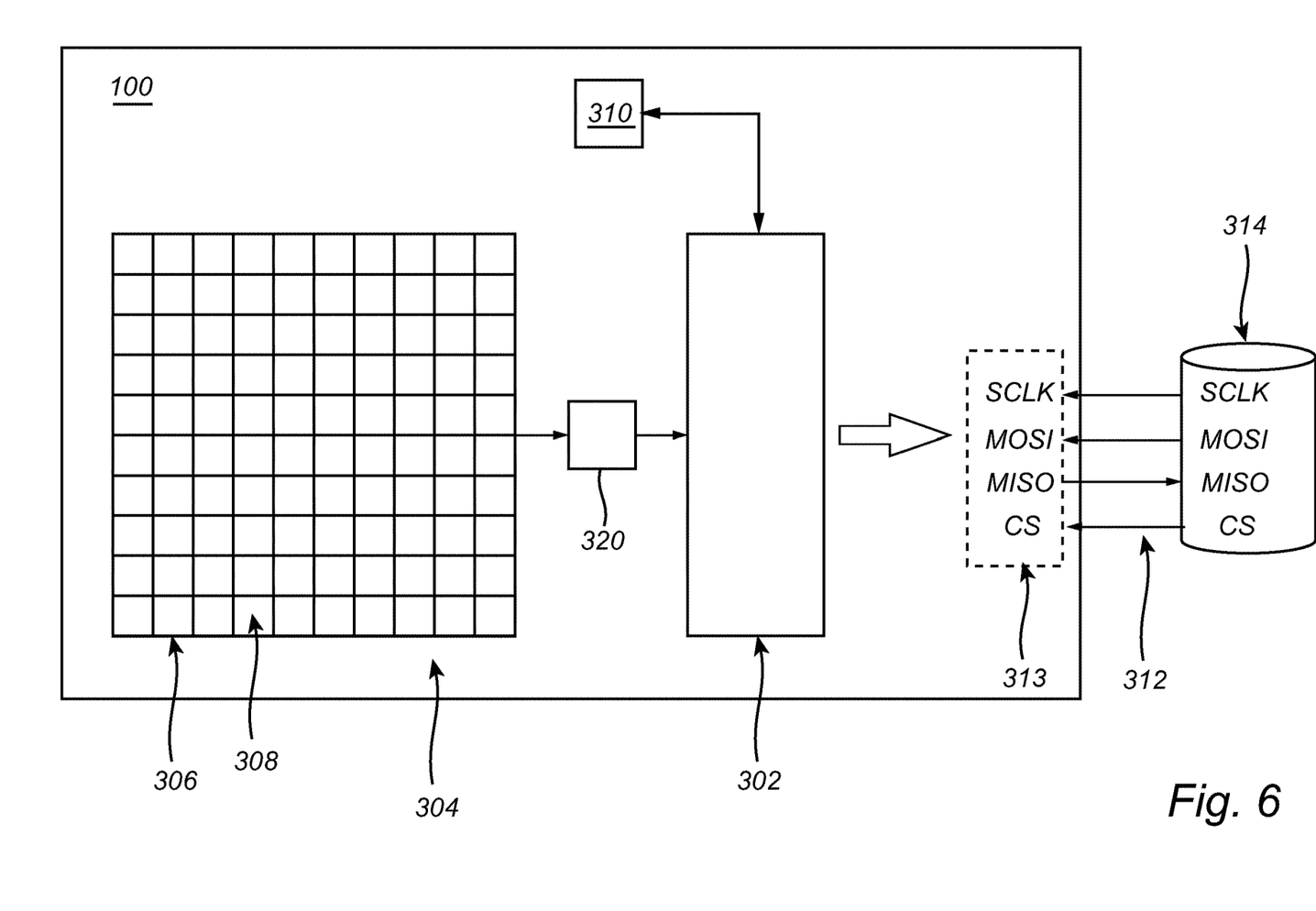
FIG. 6 schematically illustrates an optical biometric sensor and a host device according to embodiments of the invention.

Turning now to FIG. 6, which illustrates an embodiment where the optical biometric sensor comprising a memory storage 320 configured to store data indicative of the acquired sensing signals for a time duration such that a data transfer rate to the data transfer bus 312 is below or equal to the present data transfer capacity on the data transfer bus. In other words, in order to delay the transfer of some of the converted sensing signals, a memory storage 320, e.g. a buffer, may be implemented to store the acquired signals for some time before they are received by the bus 312. The memory storage 320 may be included in the pixel, i.e. to store the charge generated in each pixel during exposure. The memory storage 320 may be combined with the memory storage 311 described in FIG. 3.

Preferably, the optical biometric sensor is a slave and the host device is a master for the communication interface including the data transfer bus. The host device 314 may send a request via the communication interface 312 to the optical biometric sensor, indicating that it requests image data. In order for the optical biometric sensor to fulfil this request, a certain number of bytes is expected on the communication interface 312, by the host device. Sending a request may include writing a command to a register via the communication interface. Such communication protocols, e.g. I3C or SPI are known per se. A data transfer bus is included in the communication interface 312.

In other words, the optical biometric sensor may be configured to be controlled by a host controller to start of exposure of a of the photodetectors. For this, a start command may be received by the timing circuitry 310 from the host controller for start of exposure of the photodetectors, or that the timing circuitry 310 is operative according to e.g. the SPI clock.

As described above, there is provide a timing circuitry 310 arrangeable in an optical biometric sensor 100 having an image sensor 304 comprising an array 306 of photodetectors 308 for acquiring analog sensing signals, and a read-out circuitry 320 controllable for converting the analog sensing signals to digital signals. The timing circuitry 310 is configured to control the read-out circuitry 320 to provide digital signals based on a present data transfer capacity on a data transfer bus 312 configured to transfer data indicative of the digital signals from the optical biometric sensor to a host device 314.

The timing circuitry 310 is preferably configured to control the operation of the read-out circuitry 302 such that a data production rate resulting from the converted analog sensing signals is below or equal to the present data transfer capacity on the data transfer bus 312.

For example, the timing circuitry may be configured to control the operation interval durations of the read-out circuitry 302 such that a data production rate resulting from the converted analog sensing signals is below or equal to the present data transfer capacity on the data transfer bus 312.

Figure 7:
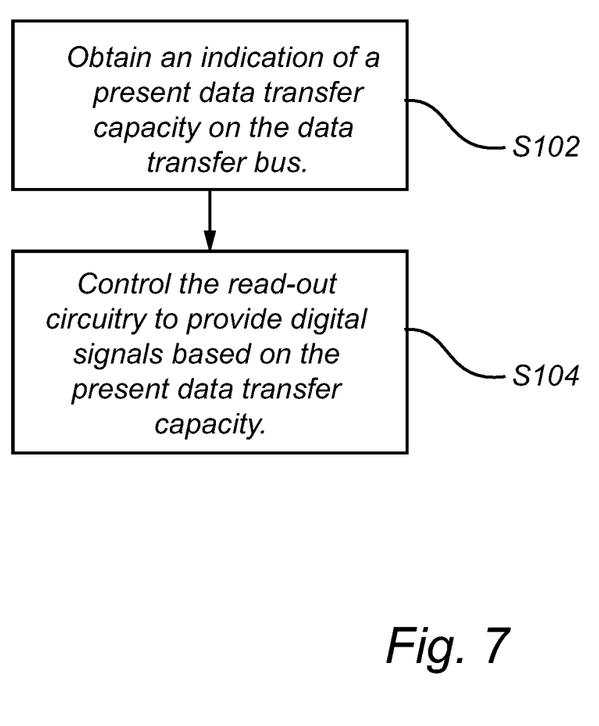
FIG. 7 is a flow-chart of a method steps for controlling an optical biometric sensor according to embodiments of the invention.

FIG. 7 is a flow-chart of method steps according to embodiments of the present invention. The method is for controlling an optical biometric sensor having an image sensor comprising an array of photodetectors for acquiring analog sensing signals, and a read-out circuitry controllable for converting the analog sensing signals to digital signals. The method comprises a step S102 comprising obtaining an indication of a present data transfer capacity on a data transfer bus configured to transfer data indicative of the digital signals from the optical biometric sensor to a host device. In step S014, controlling the read-out circuitry to provide digital signals based on the present data transfer capacity.

Controlling the operation of the read-out circuitry may be performed such that a data production rate resulting from the converted analog sensing signals is below or equal to the present data transfer capacity on the data transfer bus. Further, the method of FIG. 7 may comprise controlling the operation interval durations of the read-out circuitry such that a data production rate resulting from the converted analog sensing signals is below or equal to the present data transfer capacity on the data transfer bus.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the optical biometric sensor.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. Computer-readable media may generally correspond to (1) tangible computer-readable storage media which are non-transitory or (2) a communication media such as signal or carrier waves.

Even though the invention has been described with reference to specific exemplifying embodiments thereof, many different alterations, modifications and the like will become apparent for those skilled in the art. Also, it should be noted that parts of the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical biometric sensor comprising:
   a read-out circuitry controllable for converting analog sensing signals to digital signals, the analog sensing signals being indicative of an image acquired by an image sensor comprising an array of photodetectors; and
   a timing circuitry configured to control the operation of the read-out circuitry such that a data production rate of digital signals resulting from the converted analog sensing signals is below or equal to a present data transfer capacity on a data transfer bus configured to transfer data indicative of the digital signals from the optical biometric sensor to a host device.

2. The optical biometric sensor according to claim 1, wherein the timing circuitry is configured to control the operation interval durations of the read-out circuitry such that a data production rate resulting from the converted analog sensing signals is below or equal to the present data transfer capacity on the data transfer bus.

3. The optical biometric sensor according to claim 1, configured to perform data processing to adjust a data production rate resulting from the converted analog sensing signals to thereby adjust an amount of data to transfer on the data transfer bus.

4. The optical biometric sensor according to claim 3, wherein the data processing is local post-processing settings of the image sensor adapted to cause a reduction in data production rate.

5. The optical biometric sensor according to claim 1, comprising a memory storage configured to store data indicative of the digital sensing signals for a time duration such that a data transfer rate to the data transfer bus is below or equal to the present data transfer capacity on the data transfer bus.

6. The optical biometric sensor according to claim 5, wherein the memory storage is configured to store digital data converted by the read-out circuitry, and to store the converted digital data, and wherein the analog to digital conversion rate is adapted exceed the data transfer date of the data transfer bus.

7. The optical biometric sensor according to claim 1, wherein the image sensor is a global shutter image sensor.

8. The optical biometric sensor according to claim 1, wherein the optical biometric sensor is a slave and the host device is a master for the communication interface including the data transfer bus.

9. An electronic device comprising:
the optical biometric sensor according to claim 1, and processing circuitry configured to:
receive a signal from the optical biometric sensor indicative of a biometric feature, and
perform a biometric authentication procedure based on the biometric feature.

10. The electronic device according to claim 9, wherein the electronic device is a mobile device.

11. A timing circuitry arrangeable in an optical biometric sensor having an image sensor comprising an array of photodetectors for acquiring analog sensing signals, and a read-out circuitry controllable for converting the analog sensing signals to digital signals,
the timing circuitry being configured to control the operation of the read-out circuitry such that a data production rate of digital signals resulting from the converted analog sensing signals is below or equal to a present data transfer capacity on a data transfer bus configured to transfer data indicative of the digital signals from the optical biometric sensor to a host device.

12. The timing circuitry according to claim 11, configured to control the operation interval durations of the read-out circuitry such that a data production rate resulting from the converted analog sensing signals is below or equal to the present data transfer capacity on the data transfer bus.

13. A method for controlling an optical biometric sensor having an image sensor comprising an array of photodetectors for acquiring analog sensing signals, and a read-out circuitry controllable for converting the analog sensing signals to digital signals, the method comprising:
obtaining an indication of a present data transfer capacity on a data transfer bus configured to transfer data indicative of the digital signals from the optical biometric sensor to a host device; and
controlling the operation of the read-out circuitry such that a data production rate resulting from the converted analog sensing signals is below or equal to the present data transfer capacity on the data transfer bus.

14. The method according to claim 13, comprising controlling the operation interval durations of the read-out circuitry such that a data production rate resulting from the converted analog sensing signals is below or equal to the present data transfer capacity on the data transfer bus.

* * * * *